(12) United States Patent
Doi

(10) Patent No.: US 9,676,039 B2
(45) Date of Patent: Jun. 13, 2017

(54) TOOL HOLDER

(75) Inventor: Masayuki Doi, Minamiawaji (JP)

(73) Assignee: BIG DAISHOW A SEIKI CO LTD, Higashiosaka-shi, Osaka (JP)

( * ) Notice: Subject to any disclaimer, the term of this patent is extended or adjusted under 35 U.S.C. 154(b) by 262 days.

(21) Appl. No.: 14/119,568

(22) PCT Filed: May 25, 2011

(86) PCT No.: PCT/JP2011/061959
§ 371 (c)(1),
(2), (4) Date: Jan. 9, 2014

(87) PCT Pub. No.: WO2012/160664
PCT Pub. Date: Nov. 29, 2012

(65) Prior Publication Data
US 2014/0197607 A1  Jul. 17, 2014

(51) Int. Cl.
B23B 31/117 (2006.01)
B23B 31/30 (2006.01)

(52) U.S. Cl.
CPC ........ *B23B 31/1172* (2013.01); *B23B 31/305* (2013.01); *B23B 31/1176* (2013.01); *Y10T 279/1216* (2015.01); *Y10T 279/1241* (2015.01)

(58) Field of Classification Search
CPC ........... Y10T 279/1241; B23B 31/1172; B23B 31/1176; B23B 31/305
USPC ...................................................... 279/4.06
See application file for complete search history.

(56) References Cited

U.S. PATENT DOCUMENTS

| | | | | |
|---|---|---|---|---|
| 2,920,895 A * | 1/1960 | Krouse | ................. | B23B 31/204 |
| | | | | 279/4.06 |
| 3,516,681 A | 6/1970 | Cox et al. | | |
| 3,677,559 A * | 7/1972 | Andre | ................... | B23B 31/305 |
| | | | | 279/4.03 |
| 3,830,509 A * | 8/1974 | Weber | .................... | B23B 31/305 |
| | | | | 242/571.1 |
| 3,844,546 A * | 10/1974 | Greenberg | .......... | B23B 31/1176 |
| | | | | 269/22 |
| 4,934,672 A * | 6/1990 | Craft | ..................... | B23B 31/305 |
| | | | | 269/22 |
| 6,224,067 B1 * | 5/2001 | Lindstrom | ............ | B23B 31/204 |
| | | | | 279/4.09 |
| 6,708,987 B1 | 3/2004 | Sperber | | |
| 7,287,941 B1 | 10/2007 | Erickson | | |
| 7,316,403 B2 * | 1/2008 | Andre | ................... | B23B 31/305 |
| | | | | 269/22 |
| 7,914,010 B2 | 3/2011 | Herud | | |
| 7,967,300 B2 * | 6/2011 | Andre | ................... | B23B 31/025 |
| | | | | 279/2.08 |

(Continued)

FOREIGN PATENT DOCUMENTS

| | | | | |
|---|---|---|---|---|
| CH | 419783 A | * 8/1966 | .......... | B23B 31/305 |
| CN | 101010163 A | 8/2007 | | |

(Continued)

OTHER PUBLICATIONS

English machine translations of Germany Patent DE 3417430 A1 issued to Manfred Koenig, Nov. 1985.*

(Continued)

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

Provided is a holder device that uses a pressure medium suitable for gripping a long and thin grasped object, the device eliminating need for a small-diameter machining for a device body and allowing use of a material suitable for sleeve deformation at a portion where a pressure chamber is formed. A holder device capable of deforming in a radial direction for fastening a grasped object 7 through a function of a pressure medium, includes a device body 2, a sleeve 3 disposed at a leading end of the device body 2 for gripping the grasped object 7, a pressure chamber 8 formed circumferentially in the sleeve 3, and a support portion 9 provided continuously from the device body 2 for forming the pressure chamber 8 together with the sleeve 3.

9 Claims, 2 Drawing Sheets

(56) References Cited

U.S. PATENT DOCUMENTS

| | | | |
|---|---|---|---|
| 2004/0191022 A1* | 9/2004 | Broghammer | B23B 29/03421 |
| | | | 409/234 |
| 2006/0091618 A1* | 5/2006 | Rosberg | B23B 31/1172 |
| | | | 279/4.01 |
| 2007/0145694 A1 | 6/2007 | Ullrich et al. | |
| 2011/0175300 A1* | 7/2011 | Schuffenhauer | B23B 31/305 |
| | | | 279/4.06 |

FOREIGN PATENT DOCUMENTS

| | | | | |
|---|---|---|---|---|
| CN | 101511517 A | 8/2009 | | |
| DE | 2644576 A1 | 4/1978 | | |
| DE | 3417430 A1 * | 11/1985 | ........... | B23B 31/305 |
| DE | 9305704 U1 | 7/1993 | | |
| DE | 102008050213 A1 | 4/2010 | | |
| DE | WO 2010037549 A1 * | 4/2010 | ........... | B23B 31/305 |
| DE | 102009049582 B3 * | 5/2011 | ........... | B23B 31/305 |
| DE | 102010008872 A1 | 8/2011 | | |
| EP | 0074332 A2 | 3/1983 | | |
| EP | 2174736 A1 | 4/2010 | | |
| GB | 1208555 | 10/1970 | | |
| JP | 06-036709 U | 5/1994 | | |
| JP | 2007-531634 A | 11/2007 | | |
| JP | 2011-045963 A | 3/2011 | | |

OTHER PUBLICATIONS

English machine translations of Germany Patent document DE 102009049582B3 to Johann Gross, May 5, 2011.*
International Search Report of PCT/JP2011/061959, English abstract is attached.
Supplementary European Search Report of EP11866269 dated Oct. 28, 2014.

* cited by examiner

TOOL HOLDER

CROSS REFERENCE TO RELATED APPLICATIONS

The present application is a U.S. national stage of PCT/JP2011/061959 filed on May 25, 2011, the disclosure of which is incorporated herein by reference.

TECHNICAL FIELD

The present invention relates to a holder device for holding a cutting tool such as an end mill inserted to a tool insertion portion, the holder device being configured to control a pressure of a pressure medium such as a fluid held therein to deform the tool insertion portion, thereby to apply a pressure to a grasped portion of the cutting tool for grasping thereof.

BACKGROUND ART

In a holder device utilizing a pressure medium, a grasping portion for grasping a cutting tool is formed thin to promote its deformation whereas a support portion is formed thick to minimize its deformation for the sake of pressure loss prevention. In this way, an outer diameter of the support portion of the holder device is increased relative to a shaft diameter of a cylindrical portion of the cutting tool. However, this increased outer diameter of the support portion relative to the small-diameter cutting tool tends to invite interference when a narrow groove shape of an object is to be machined.

As an example of the holder device utilizing the pressure medium suitable for such a long and thin structure, there is known the holder device including a pressure guide arrangement for transmitting a supplied pressure along an axial distance between a pressure chamber and a pressure generator, the guide arrangement being formed of a sealed gap or passageway which is provided concentrically and annularly relative to a chuck axis line (see Patent Document 1).

PRIOR ART DOCUMENT

Patent Document

Patent Document 1: Japanese Unexamined Patent Application National Transfer Publication No. 2007-531634

SUMMARY OF THE INVENTION

Object to be Achieved by Invention

A tool chuck being elastic by liquid-pressure of Patent Document 1 includes an elastic sleeve disposed on the tool side and surrounded by a pressure chamber, a pressure generator axially spaced apart from the elastic sleeve relative to the axis of the chuck, and a pressure guide arrangement for transmitting a pressure from the pressure generator to the pressure chamber, wherein the elastic sleeve is deformable in a radial direction so as to clamp and fix a tool by an action of a pressure medium held within the pressure chamber. In the above, the pressure chamber is disposed between an end of a clamping sleeve formed integral with the device body and the elastic sleeve disposed on the inner circumference side of the clamping sleeve. The pressure guide arrangement is formed of an annular gap in the inner circumferential face of the clamping sleeve concentric relative to the chuck axis.

However, with the above-described configuration, due to the long axial distance existent between the pressure chamber and the pressure generator, both the device body and the clamping sleeve need to form a long and thin shaft or hole. And, extreme difficulty arises if an effort is made to enhance the circularity or cylindricality of the chuck portion or deviation precision relative to the chuck axis through a long and thin machining. Further, the pressure chamber is formed between an end of the clamping sleeve formed integral with the device body and the elastic sleeve, so the clamping sleeve should preferably have a high rigidity as a whole. On the other hand, regarding a portion at end of the clamping sleeve where the pressure chamber is to be formed, lower rigidity is sometimes preferred for allowing deformation of the elastic sleeve.

The object of the present invention is to provide a holder device that uses a pressure medium suitable for grasping a long and thin object to be grasped, the device eliminating need for a diameter-reducing machining for the device body and allowing use of a material suitable for sleeve deformation at a portion where a pressure chamber is formed.

Means for Achieving the Object

According to a first characterizing feature of a holder device relating to the present invention, a holder device comprises: a device body; a sleeve disposed at a leading end of the device body and capable of deforming in a radial direction for grasping the grasped object through an action of a pressure medium; a pressure chamber formed circumferentially in the sleeve; and a support portion provided continuously from the device body for forming the pressure chamber together with the sleeve.

With the above-described configuration, the end of the holder device is comprising the device body, the sleeve and the support portion; and in particular, the leading end portion is comprising the sleeve and the support portion that are provided separately from the device body. Therefore, even with the holder device utilizing a pressure medium suitable for a long and thin construction, by effecting a small-diameter machining on the support portion, a small-diameter machining for the device body becomes unnecessary. Further, by using the sleeve and the support portion provided separately from the device body, a different material can be used for the sleeve and the support from a material used for the device body. With this, through selection from various materials for the sleeve and the support portion, the deformation of the sleeve can be readily controlled through an optimal combination of the sleeve and the support portion. As a result, the compression/expansion function of the sleeve is improved, so that the grasped object can be held rigidly.

According to a second characterizing feature of the present invention, the device body includes a pressure guide passageway for transmitting a pressure to the pressure chamber, and the pressure chamber is formed between the support portion and the sleeve.

With the above-described configuration, of the device body, the sleeve and the support portion, the pressure guide passageway is included in the device body, and the pressure chamber is formed by the two members, i.e. the sleeve and the support portion. Hence, the pressure guide passageway is formed in the device body having the rigidity, whereas the pressure chamber is formed with a shape suitable for the deformation of the sleeve by the sleeve and the support portion whose forming materials can be selected. As a result, the machining of the pressure guide passageway becomes easy and the machining precision of the pressure chamber can be improved.

According to a third characterizing feature of the holder device relating to the present invention, the pressure guide passageway and the pressure chamber are disposed at positions differing in a radial distance from a rotational axis of the device body.

If the pressure guide passageway and the pressure chamber are disposed at positions differing in a radial distance from a rotational axis of the device body as provided by the above-described arrangement, the position of the pressure guide passageway in the device body can be freely set. The sleeve freely sets the degree of expansion through reduction of thickness at its deforming portion with taking its material characteristics into consideration. For this reason, the pressure chamber is provided normally at a position having a short radial distance from the rotational axis of the device body. On the other hand, the pressure guide passageway can be provided by forming a radially large space at the thickness-wise center of the device body. So, speedy supply of the pressure to the pressure chamber is made possible. Further, when the pressure guide passageway is to be formed, a hole drilling work to the device body can be carried out easily.

According to a fourth characterizing feature of the holder device relating to the present invention, between the pressure guide passageway and the pressure chamber, there is formed an annular pressure-medium storage space surrounded by an end face of the device body and an end face of the support portion.

With the above-described arrangement, if an annular pressure-medium storage space surrounded by an end face of the device body and an end face of the support portion is formed between the pressure guide passageway and the pressure chamber, a liquid pressure of the pressure guide passageway will pervade circumferentially of the sleeve via the annular pressure-medium storage space. So that, the liquid pressure of the pressure chamber can easily pervade throughout in the circumferential direction. As a result, the grasped object can be grasped with a uniform pressure throughout in the circumferential direction.

MODE OF EMBODYING THE INVENTION

Next, as an embodiment of the present invention, a screw-operation type holder device will be explained with reference to the accompanying drawings.

Figure 1:
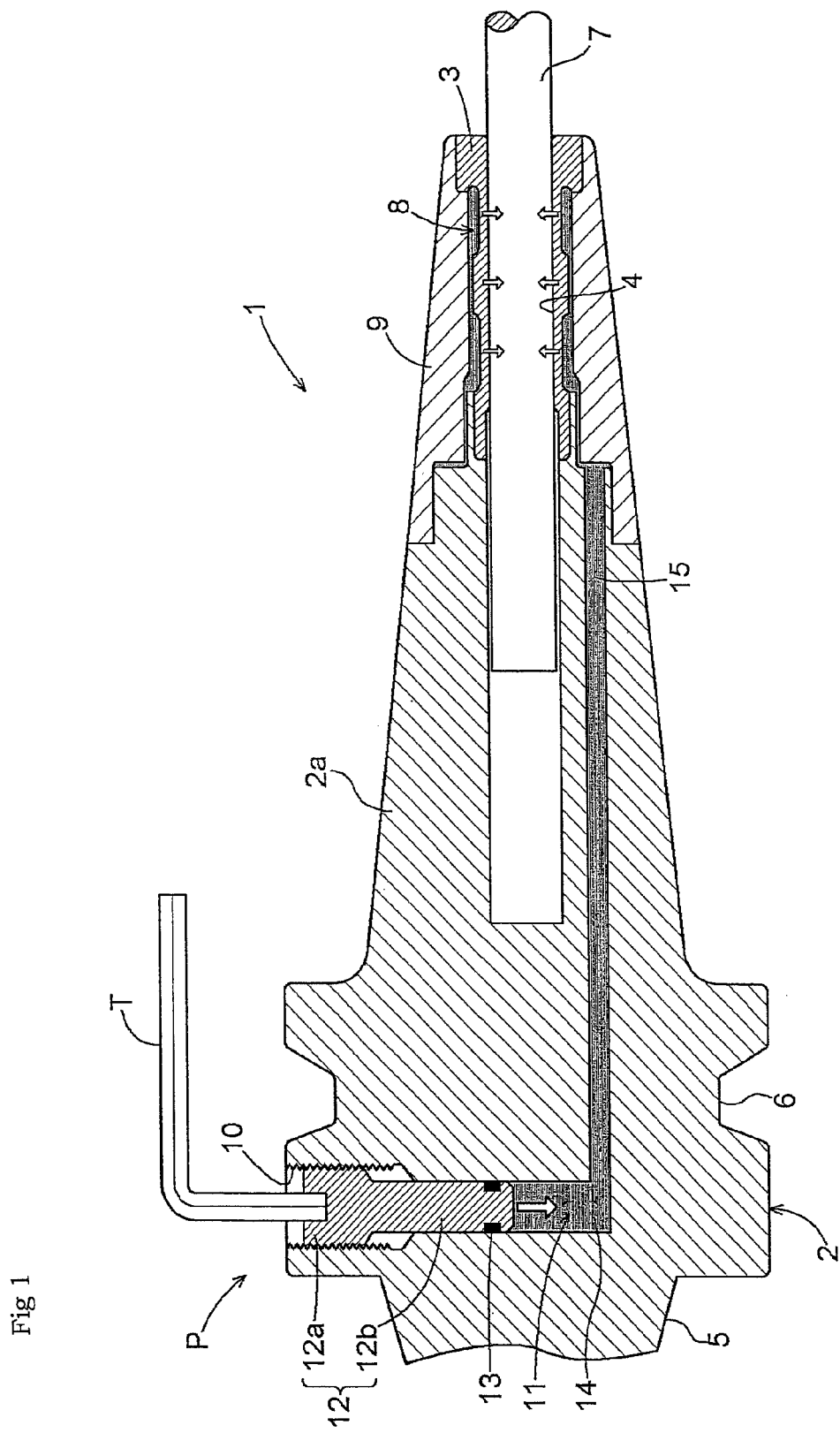
FIG. 1 is a side view in section showing a holder device in its entirety.

As shown in FIG. 1, a holder device 1 according to this embodiment includes a device body 2, a sleeve 3 provided on a leading end side of a tubular portion 2a of the device body 2, a support portion 9 formed circumferentially of the sleeve 3 on its outer circumference side, and a shank 5 projecting on the rear end side of the device body 2 to be engaged with a spindle of a machining tool. At an intermediate portion of the device body 2, a groove 6 to be grasped by a manipulator is formed.

The sleeve 3 includes a tubular hole 4 for accommodating and engaging a grasped object 7 such as a cutting tool. Further, in an outer circumference of the sleeve 3, a pressure chamber 8 is provided in such a manner as to surround throughout the inner circumferential face of a tubular hole 4 of the sleeve 3, and around the outer circumference of the pressure chamber 8, there is provided a support portion 9 covering this pressure chamber 8.

The device body 2 includes a pressure generator P having a female threaded hole 10 extending radially from its outer circumference face and a pressure generation chamber 11 communicating the female threaded hole 10 with the pressure chamber 8. Within the female threaded hole 10 and the pressure generation chamber 11, a threaded bar 12 is attached. This threaded bar 12 includes a head portion 12a and a leading end portion 12b having a smaller diameter than the head portion 12a. At the head portion 12a of the threaded bar 12, a male threaded portion is formed. And, on the outer circumferential face of the leading end portion 12b, a seal member 13 such as an O-ring is provided. The inside diameter of the pressure generation chamber 11 is set smaller than the inside diameter of the female threaded portion 10.

In operation, as the threaded bar 12 is inserted from its leading end portion 12b into the female threaded portion 10 thereby to threadingly introduce the male threaded portion into the female threaded hole 10 and push the leading end portion 12b of the threaded bar 12 into the pressure generation chamber 11, the seal member 13 at the leading end portion 12b comes into sealing contact with the whole inner circumferential face of the pressure generation chamber 11. As a result, an amount of fluid (pressure medium) such as water, oil, etc., is introduced from the pressure generation chamber 11 into the pressure chamber 8 to be sealed therein.

As shown in FIG. 1, by engaging a wrench T with the head portion 12a of the threaded bar 12 and then rotatably operating it about the axis of the threaded bar 12, a threading-in engagement amount of the threaded bar 12 relative to the female threaded hole 10 and the pressure generation chamber 11 can be adjusted.

If the capacity of the pressure generation chamber 11 is reduced by increasing the threading-in amount of the threaded bar 12, there occurs increase in the pressure of the fluid 14 sealed in and between the pressure generation chamber 11 and the pressure chamber 8. With this, the sleeve 3 is expanded toward the tubular hole 4 side, thereby to strongly grip the grasped object 7 engaged in the tubular hole 4 of the sleeve 3.

On the other hand, if the capacity of the pressure generation chamber 11 is increased by decreasing the threading-in amount of the threaded bar 12, there occurs decrease in the pressure of the fluid 14 sealed in and between the pressure generation chamber 11 and the pressure chamber 8. With this, the sleeve 3 is returned to the pressure chamber 8 side, thereby to allow removal of the grasped object 7 engaged in the tubular hole 4 of the sleeve 3.

Figure 2:
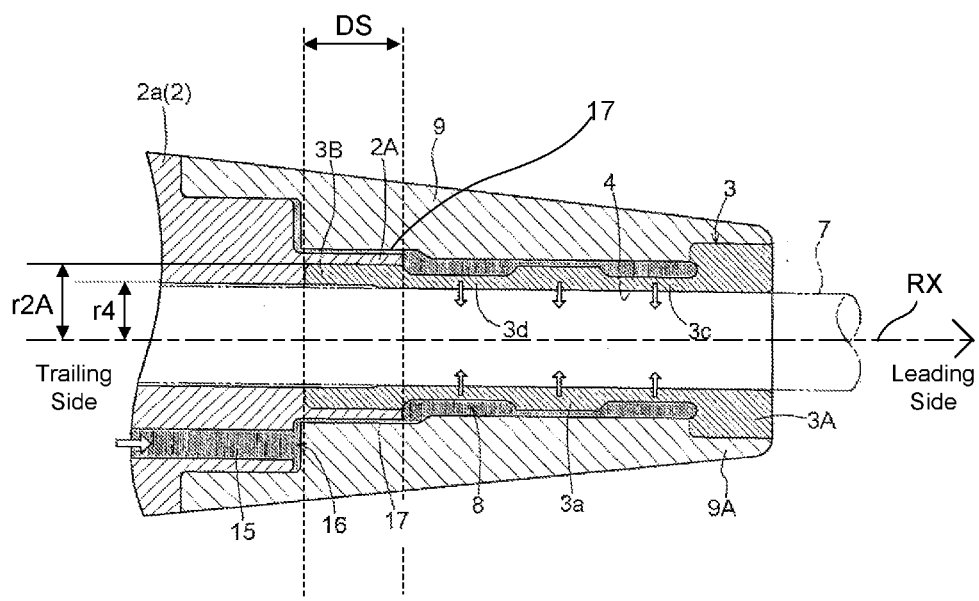
FIG. 2 is a side view in section showing a leading end portion of the holder device.

As shown in FIG. 2, the sleeve 3 includes, at an axial center portion thereof, a trapezoidal protruding portion 3a protruding toward the pressure chamber 8 side and includes also thin portions 3c, 3d on axially opposed sides of the trapezoidal protruding portion 3a. Therefore, when the pressure inside the pressure chamber 8 is increased, in the sleeve 3, its thin portions 3c, 3d expand especially largely toward the tubular hole 4 side, so that the grasped object 7 is grasped mainly via the support from the thin portions 3c, 3d.

When forming the leading end portion of the holder device 1, firstly, the device body 2 and the support portion 9 will be fixedly attached to each other. Then, the sleeve 3 will be inserted from its leading end side for fixedly attaching this sleeve 3 to the device body 2 and the support portion 9.

The device body 2 includes a pressure guide passageway 15 extending parallel with the axial direction. The pressure guide passageway 15 is formed by a machining e.g. a drilling at a position of the device body 2 different in the radial direction relative to the rotational axis of the device body 2 from the position of the pressure chamber 8. And, this passageway 15 is communicated to an annular pressure-medium storage space 16 formed between the device body 2 and the support portion 9. The pressure-medium storage space 16 is surrounded by an end face of the device body 2 and an end face of the support portion 9 and is communicated to the pressure chamber 8 via a communication passageway 17 formed between an outer circumferential face of the device body 2 and an inner circumferential face of the support portion 9. With the above-described formation of the annular pressure-medium storage space 16 with utilization of an end face of the support portion 9, the liquid pressure of the pressure guide passageway 15 will pervade in the circumferential direction of the sleeve 3 via the annular pressure-medium storage space 16, so that pervading of the liquid pressure of the pressure chamber 8 throughout in the circumferential direction is promoted. As a result, the grasped object 7 can be grasped with uniform pressure from the whole circumferential direction.

With the above-described arrangement, the end portion of the holder device 1 is formed by the device body 2, the sleeve 3 and the support portion 9, and its leading end portion, in particular, is comprised of the sleeve 3 and the support portion 9 that are provided separately from the device body 2. Therefore, even in the case of a holder device 1 utilizing a pressure medium suitable for a long and thin construction, by effecting a small-diameter machining work to the support portion 9, a small-diameter machining work becomes unneeded for the device body 2. Further, with the use of the sleeve 3 and the support portion 9 that are provided separately from the device body 2, it is possible to employ a different material(s) for the sleeve 3 and the support portion 9 than a material used for the device body 2. With this, through selection from various kinds of material for the sleeve 3, the deformation of the sleeve 3 can be readily controlled by an optimal combination of the sleeve 3 and the support portion 9. As a result, the compression/expansion action of the sleeve 3 is improved, so that the grasped object 7 can be held rigidly.

Also, the pressure guide passageway 15 is formed in the device body 2 and the pressure chamber 8 is formed along the axial direction between the inner circumferential face of the support portion 9 and the outer circumferential face of the sleeve 3. With this, the pressure guide passageway 15 is formed in the device body 2 having rigidity, whereas the pressure chamber 8 is formed with a shape suitable for the deformation of the sleeve 3 by the sleeve 3 and the support portion 9 whose forming materials can be selected. As a result, the machining of the pressure guide passageway 15 becomes easy and the machining precision of the pressure chamber 8 can be improved.

Moreover, the pressure guide passageway 15 and the pressure chamber 8 are disposed at positions differing in the radial distance from the rotational axis of the device body 2. So, the position of the pressure guide passageway 15 in the device body 2 can be freely set.

For the sleeve 3, its expansion degree is set freely by forming its deforming portion thin in view of its material characteristics. For this reason, the pressure chamber 8 is provided at a position having a short radial distance from the rotational axis of the device body 2. On the other hand, the pressure guide passageway 15 is a space having a large diameter formed at the thickness-wise center portion of the device body 2, so speedy supply of pressure to the pressure chamber 8 is made possible.

Figure 3:
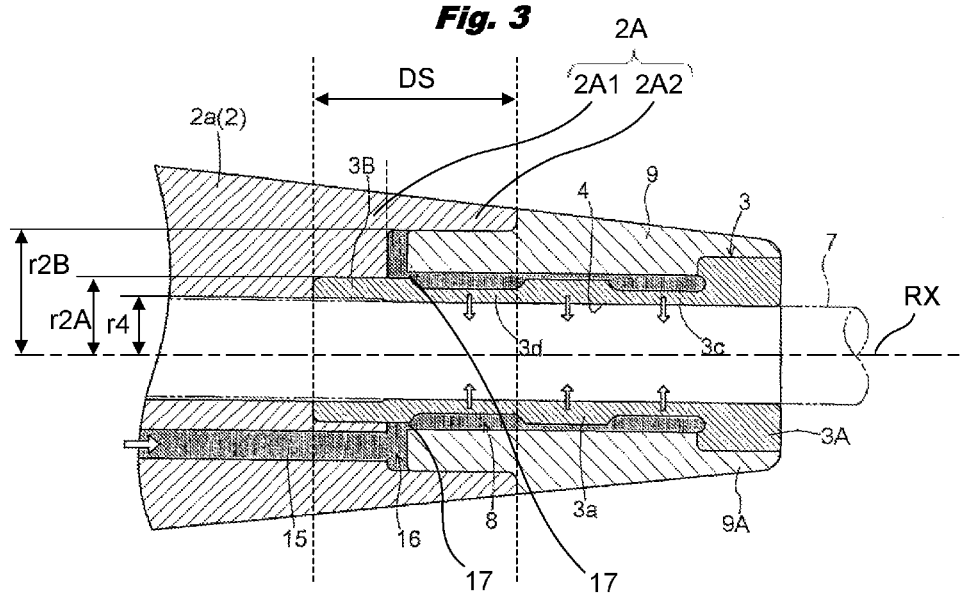
FIG. 3 is a side view in section showing a leading end portion of a holder device according to a further embodiment.

OTHER EMBODIMENTS (1) In the foregoing embodiment, the communication passageway 17 is provided between the pressure guide passageway 15 and the pressure chamber 8. Instead, as shown in FIG. 3, by increasing the length of the device body 2 and decreasing the length of the support portion 9, a reaction force from the pressure chamber 8 can be caused to be received by the device body 2.

(2) In the foregoing embodiment, there was shown the example wherein the support portion 9 is disposed on the outer circumferential side of the sleeve 3 and the pressure chamber 8 is formed between the outer circumferential face of the sleeve 3 and the inner circumferential face of the support portion 9. Instead of this, the support portion 9 may be disposed on the inner circumferential side of the sleeve 3 and the pressure chamber 8 may be formed between the inner circumferential face of the sleeve 3 and the outer circumferential face of the support portion 9. Incidentally, in this case, the grasped object is grasped through expansion of the outer diameter of the sleeve 3 with the action of the pressure medium inside the pressure chamber 8.

(3) In the foregoing embodiment, there was shown the example wherein the pressure chamber 8 is formed by the sleeve 3 and the support portion 9. Instead, the pressure chamber 8 may be formed by the sleeve 3, the device body 2 and the support portion 9.

(4) At an axial center portion of the sleeve 3, there may be formed a protruding portion which rises gently toward the pressure chamber 8 side. With this, when the pressure inside the pressure chamber 8 is increased, the sleeve 3 as a whole will be expanded toward the tubular hole 4 side. Alternatively, the axial center portion of the sleeve 3 may be formed flat having no protruding portion.

FIG. 2 illustrates the first embodiment. The device body 2 is composed with the tubular portion 2a, which is defined as a main body, and the distal portion of device body 2, which is denoted with 2A, having an annular shape. The inner radius of the distal portion is with r2A, which is greater than a radius r4 of tubular hole 4. The range where the distal portion (or distal extending portion 2A) extends in rotational axis RX from a leading edge face 2X of the tubular portion 2a is denoted with distal section DS. Within the section, sleeve 3, distal extending portion 2A and support portion 9 are layered in this order in the radial direction. The sleeve and the distal extending portion are in contact, the communication passage way 17 is formed outside the portion and inside the support portion FIG. 3 illustrates the second embodiment. The device body 2 is composed with the tubular portion 2a and the distal portion of device body 2, which is denoted with 2A, having an annular shape. Further, in this embodiment, the distal portion 2A is composed with a first extending portion 2A1 and a second extending portion 2A2. The second extending portion is at the leading side, extending from a leading edge face 2X', than the first extending portion extending portion. The leading edge face 2X is a part of the tubular portion 2a. The inner radius of the first extending portion is denoted with r2A, which is greater than radius r4 of tubular hole 4 and the innder radius of the second extending portion is denoted with r2B, which is greater than radius r2A. The range where the distal portion (or distal extending portion 2A) extends in rotational axis RX is denoted with distal section DS. Within the section, sleeve 3 is inserted inside the first extending portion. The support portion 9 is inserted inside the second extending portion. The second extending portion and the support portion are in contact, and a pressure chamber 8 is formed outside the sleeve and inside the support portion. The communication passageway 17, which is an annular shape, is provided to connect the pressure-medium storage space 16 with the pressure chamber 8 such that the pressure medium from the pressure-medium storage space is able to flow smoothly to the pressure chamber. The communication passageway 17 is formed between the support portion 9 and the sleeve 3 in the radius direction.

Sleeve 3 may be formed of a material that differs from that of the device body, but may be formed of the same material as that of the device body. Where the same material is used, the flexibility required to the sleeve can be achieved by forming the sleeve thin. Using three different materials for sleeve 3, support portion 9, distal extending portion 2A is preferred in the light of enhancing the combination of different characteristics brought from the materials.

INDUSTRIAL APPLICABILITY

The present invention is applicable to various holder devices for use in attaching a cutting tool or the like to a spindle of a machining tool.

DESCRIPTION OF REFERENCE MARKS/NUMERALS 1 holder device
2 device body
3 sleeve
4 tubular hole
7 grasped object
8 pressure chamber
9 support portion
14 fluid (pressure medium)
15 pressure guide passageway
16 pressure-medium storage space
P pressure generator

The invention claimed is:

1. A tool holder having a chuck section that grasps an cutting tool at a leading side and a shank section that is at a trailing side of the tool holder, comprising:
 a holder body that is composed with a main body and a distal extending portion (2A), the main body having an annular shape, the distal extending portion extending in the rotation axis from a leading edge face of the main body;
 a sleeve, which has an annular shape and is a physically separated part from the holder body, disposed at the leading side of the holder body and capable of deforming in a radial direction with respect to the rotational axis for grasping the grasped cutting tool through an action of a pressure medium, the sleeve having a trailing portion that is at the trailing side and that is inserted inside the distal extending portion in a predetermined length in order to be secured therein;
 a support portion, which has an annular shape and is a physically separated part from the holder body and the sleeve, disposed over the sleeve in the radial direction such that a contacting portion with the sleeve is at the leading side and distant from the distal extending portion of the holder body in the rotational axis; and
 a pressure chamber provided circumferentially between the support portion and the sleeve, wherein
 the main body of the holder body includes a pressure guide passageway for transmitting a pressure through the pressure medium to the pressure chamber,
 a pressure-medium storage space has an annular shape and is formed in a space sandwiched in the rotational axis by a part of the holder body, which faces the leading side, and a part of the support part, which faces the trailing side, the pressure-medium storage space positioning between the pressure guide passageway and the pressure chamber in the rotational axis,
 a communication passageway, which has an annular shape around the rotation axis and through which the pressure medium commutes, is formed to annularly connect the pressure-medium storage space with the pressure chamber,
 the communication passageway is located outer than the pressure chamber in the radius direction,
 a section in the rotational axis where the distal extending portion exists is defined as a distal section (DS), and
 the distal extending portion of the holder body, the sleeve and the support portion are layered in the radial direction within the distal section.

2. The tool holder according to claim 1, wherein the trailing portion of the sleeve, the distal extending portion and the support portion are accumulated in this order in the radial direction from the rotational axis.

3. The tool holder according to claim 2, wherein the communication passageway is formed between the distal extending portion and the support portion in the radial direction.

4. The tool holder according to claim 1, wherein the pressure-medium storage space is sandwiched in the radius direction by the support portion, which is outer, and the main body of the holder body, which is inner.

5. The tool holder according to claim 1, wherein the support portion is arranged such that an outer circumference of the support portion is flushed with an outer circumference of the holder body in the rotational axis.

6. A tool holder having a chuck section that grasps an cutting tool at a leading side and a shank section that is at a trailing side of the tool holder, comprising:
 a holder body that is composed with a main body and a distal extending portion (2A), the main body having an annular shape, the distal extending portion extending in the rotation axis from a leading edge face of the main body;
 a sleeve, which has an annular shape and is a physically separated part from the holder body, disposed at the leading side of the holder body and capable of deforming in a radial direction with respect to the rotational axis for grasping the grasped cutting tool through an action of a pressure medium, the sleeve having a trailing portion that is at the trailing side and that is inserted inside the distal extending portion in a predetermined length in order to be secured therein;
 a support portion, which has an annular shape and is a physically separated part from the holder body and the sleeve, disposed over the sleeve in the radial direction such that a contacting portion with the sleeve is at the leading side and distant from the distal extending portion of the holder body in the rotational axis; and a pressure chamber provided circumferentially between the support portion and the sleeve, wherein the main body of the holder body includes a pressure guide passageway for transmitting a pressure through the pressure medium to the pressure chamber, a pressure-medium storage space has an annular shape and is formed in a space sandwiched in the rotational axis by a part of the holder body, which faces the leading side, and a part of the support part, which faces the trailing side, the pressure-medium storage space positioning between the pressure guide passageway and the pressure chamber in the rotational axis, a communication passageway, which has an annular shape around the rotation axis and through which the pressure medium commutes, is formed to annularly connect the pressure-medium storage space with the pressure chamber, a section in the rotational axis where the distal extending portion exists is defined as a distal section (DS), the distal extending portion of the holder body, the sleeve and the support portion are layered in the radial direction within the distal section, and the sleeve, the support portion and the distal extending portion are accumulated in this order in the radial direction from the rotational axis.

7. The tool holder according to claim 6, wherein the distal extending portion is composed with a first extending portion (2A1) and a second extending portion (2A2) having different inner radii, the first extending portion being positioned at the trailing side than the second extending portion and having the inner radius (r2A) that is the substantially same as the outer radius of the trailing portion of the sleeve, and the second extending portion being positioned at the leading side than the first extending portion and having an inner radius (r2B) that is greater than the inner radius (r2A), a trailing portion of the support portion has an outer radius that is the substantially same as the inner radius of the second extending portion such that the trailing portion of the support portion is firmly inserted inside the second extending portion in a predetermined length in order to be secured therein, and the pressure chamber is formed between the sleeve and the support portion in the radial direction.

8. The tool holder according to claim 7, wherein the communication passageway is formed between the sleeve and the trailing portion of the support portion.

9. The tool holder according to claim 7, wherein the pressure-medium storage space is sandwiched in the radius direction by the second extending portion, which is outer, and the sleeve, which is inner.

* * * * *

UNITED STATES PATENT AND TRADEMARK OFFICE
CERTIFICATE OF CORRECTION

PATENT NO.        : 9,676,039 B2
APPLICATION NO.   : 14/119568
DATED             : June 13, 2017
INVENTOR(S)       : Masayuki Doi Page 1 of 1

It is certified that error appears in the above-identified patent and that said Letters Patent is hereby corrected as shown below:

On the Title Page

In (73) Assignee, change "BIG DAISHOW A SEIKI CO LTD" to --BIG DAISHOWA SEIKI CO LTD--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*